United States Patent
Hashimoto et al.

(10) Patent No.: US 11,453,375 B2
(45) Date of Patent: Sep. 27, 2022

(54) VEHICLE CONTROLLER, VEHICLE CONTROL SYSTEM, VEHICLE LEARNING DEVICE, VEHICLE CONTROL METHOD, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 17/068,879

(22) Filed: Oct. 13, 2020

(65) Prior Publication Data
US 2021/0114580 A1 Apr. 22, 2021

(30) Foreign Application Priority Data
Oct. 18, 2019 (JP) .............................. JP2019-191357

(51) Int. Cl.
*B60W 10/06* (2006.01)
*G06K 9/62* (2022.01)
*B60W 50/04* (2006.01)
*G06N 20/00* (2019.01)

(52) U.S. Cl.
CPC .......... *B60W 10/06* (2013.01); *B60W 50/045* (2013.01); *G06K 9/6262* (2013.01); *B60W 2510/0604* (2013.01); *B60W 2510/0666* (2013.01); *G06N 20/00* (2019.01)

(58) Field of Classification Search
CPC .............. B60W 10/06; B60W 50/045; B60W 2510/0604; B60W 2510/0666; B60W 2050/0052; B60W 2050/0075; B60W 2540/10; B60W 2556/10; B60W 50/0098; B60W 2050/0088; G06K 9/6262; G06N 20/00
USPC ......................................................... 701/102
See application file for complete search history.

(56) References Cited

U.S. PATENT DOCUMENTS 6,549,815 B1 * 4/2003 Kaji .................. G05B 13/0285
700/32

FOREIGN PATENT DOCUMENTS

JP 2016-6327 A 1/2016
JP 2016006327 A * 1/2016

* cited by examiner

*Primary Examiner* — Scott A Reinbold
(74) *Attorney, Agent, or Firm* — Oblon, McClelland, Maier & Neustadt, L.L.P.

(57) ABSTRACT

A vehicle controller, a vehicle control system, a vehicle learning device, a vehicle control method, and a memory medium are provided. A switching process switches relationship defining data used in an operation process to post-measure data, when a detection process detects that a functional recovery measure has been taken. The switching process includes a process that uses, as the post-measure data, initial data that is the relationship defining data of a state before an update process is executed as the vehicle travels.

10 Claims, 6 Drawing Sheets

VEHICLE CONTROLLER, VEHICLE CONTROL SYSTEM, VEHICLE LEARNING DEVICE, VEHICLE CONTROL METHOD, AND MEMORY MEDIUM

BACKGROUND

1. Field

The present disclosure relates to a vehicle controller, a vehicle control system, a vehicle learning device, a vehicle control method, and a memory medium.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter needs to be used to set the operation amount of the throttle valve of the internal combustion engine mounted on the vehicle to an appropriate operation amount in accordance with the operation amount of the accelerator pedal. Thus, adaptation of the operation amount of the throttle valve requires a great number of man-hours by skilled workers. In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1. A vehicle controller that includes an execution device and a memory device is provide. The memory device is configured to store relationship defining data that defines a relationship between a state of a vehicle and an action variable related to an operation of an electronic device in the vehicle. The execution device is configured to execute: an obtaining process that obtains a detection value of a sensor that detects the state of the vehicle; an operation process that operates the electronic device based on a value of the action variable that is determined by the detection value obtained by the obtaining process and the relationship defining data; a reward calculating process that provides, based on the detection value obtained by the obtaining process, a greater reward when a characteristic of the vehicle meets a standard than when the characteristic of the vehicle does not meet the standard; an update process that updates the relationship defining data by inputting, to a predetermined update map, the state of the vehicle based on the detection value obtained by the obtaining process, the value of the action variable used to operate the electronic device, and the reward corresponding to the operation of the electronic device; a detection process that detects that a functional recovery measure has been taken for a component in the vehicle that affects the state of the vehicle created by the operation process; and a switching process that switches the relationship defining data used in the operation process to post-measure data, when the detection process detects that the functional recovery measure has been taken. The update map outputs the updated relationship defining data so as to increase an expected return of the reward of a case in which the electronic device is operated in accordance with the relationship defining data. The switching process includes a process that uses, as the post-measure data, initial data that is the relationship defining data of a state before the update process is executed as the vehicle travels.

This configuration calculates a reward that accompanies operation of the electronic device, so as to acquire the type of the reward obtained through that operation. Then, the relationship defining data is updated based on the reward, using the update map according to reinforcement learning. The relationship between the state of the vehicle and the action variable thus can be set to a relationship suitable for the traveling of the vehicle. This reduces the man-hours required for skilled workers when the relationship between the state of the vehicle and the action variable is set to a relationship suitable for the traveling of the vehicle.

When components in the vehicle deteriorate, the relationship defining data is updated to data suitable for use of deteriorated components through reinforcement learning. Thereafter, when a functional recovery measure is taken, the relationship defining data may become inappropriate for increasing the expected return. Accordingly, in the above-described configuration, the relationship defining data used in the operation process is switched to the initial data through the switching process when a functional recovery measure is taken. This limits the reduction in the expected return due to the functional recovery measure.

Aspect 2. In the vehicle controller of Aspect 1, the execution device is configured to execute a past data maintaining process that stores, in the memory device, the relationship defining data that is updated by the update process until a predetermined condition is met and avoids update by the update process after the predetermined condition is met, apart from the relationship defining data that is updated by the update process. The switching process includes a process that selects, as the post-measure data, the initial data or the relationship defining data that is updated in the past data maintaining process through the update process before the predetermined condition is met.

The following discusses relationship defining data that was updated through the update process as the vehicle traveled and stopped being updated before components deteriorated to such an extent that a functional recovery measure was required. After the functional recovery measure is taken, this data is likely to designate an action variable more appropriate for the state of the vehicle than the initial data of the state before the vehicle starts traveling. Accordingly, the above-described configuration selects, as the post-measure data, one of the initial data and the relationship defining data that was updated through the past data maintaining process only before a predetermined condition was met. Thus, as compared to a case in which the post-measure data is always switched to the initial data of the state before the vehicle starts traveling, the action variable can be set to a value appropriate for the state of the vehicle after the functional recovery measure on the basis of the relationship defining data after the switching process.

Aspect 3. In the vehicle controller according to Aspect 1 or 2, the execution device is configured to execute, when the detection process detects that the functional recovery measure has been taken: a post-measure data requesting process that transmits a signal requesting the post-measure data; and a post-measure data receiving process that receives the post-measure data transmitted as a result of the post-measure data requesting process. The switching process includes a process that switches the relationship defining data used in the operation process to the received post-measure data.

The above-described configuration executes the post-measure data requesting process and the post-measure data receiving process. Thus, the post-measure data can be obtained even if, for example, the controller does not have the post-measure data.

Aspect 4. A vehicle control system is provided that includes the execution device and the memory device in the vehicle controller according to Aspect 1 or 2. The execution device includes a first execution device mounted on the vehicle, and a second execution device that is an out-of-vehicle device. The second execution device is configured to execute at least a post-measure data transmitting process that transmits the post-measure data, when the detection process detects that a functional recovery measure has been taken. The first execution device is configured to execute at least the obtaining process, the operation process, and the post-measure data receiving process. The post-measure data receiving process receives data transmitted by the post-measure data transmitting process.

With the above-described configuration, the second execution device, which is an out-of-vehicle device, executes the post-measure data transmitting process. Thus, the post-measure data can be obtained even if, for example, the first execution device does not have the post-measure data. The phrase "a second execution device that is an out-of-vehicle device" means that the second execution device is not an in-vehicle device.

Aspect 5. In the vehicle control system according to Aspect 4, the first execution device is configured to execute the detection process and a post-measure data requesting process. The post-measure data requesting process transmits a signal requesting the post-measure data, when the detection process detects that the functional recovery measure has been taken.

The above-described configuration executes the post-measure data requesting process and the post-measure data receiving process. Thus, the post-measure data can be obtained even if, for example, the first execution device does not have the post-measure data.

Aspect 6. In the vehicle control system according to Aspect 4 or 5, the update process is executed by the first execution device.

Aspect 7. A vehicle controller is provided that includes the first execution device in the vehicle control system according to any one of Aspects 4 to 6.

Aspect 8. A vehicle learning device is provided that includes the second execution device in the vehicle control system according to any one of Aspects 4 to 6.

Aspect 9. A vehicle control method is provided that performs the various processes described in each of the above Aspects.

Aspect 10. A non-transitory computer readable memory medium is provided that stores a program that causes various devices to perform the various processes described in each of the above Aspects.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle controller according to a first embodiment will now be described with reference to FIGS. 1 to 4.

Figure 1:
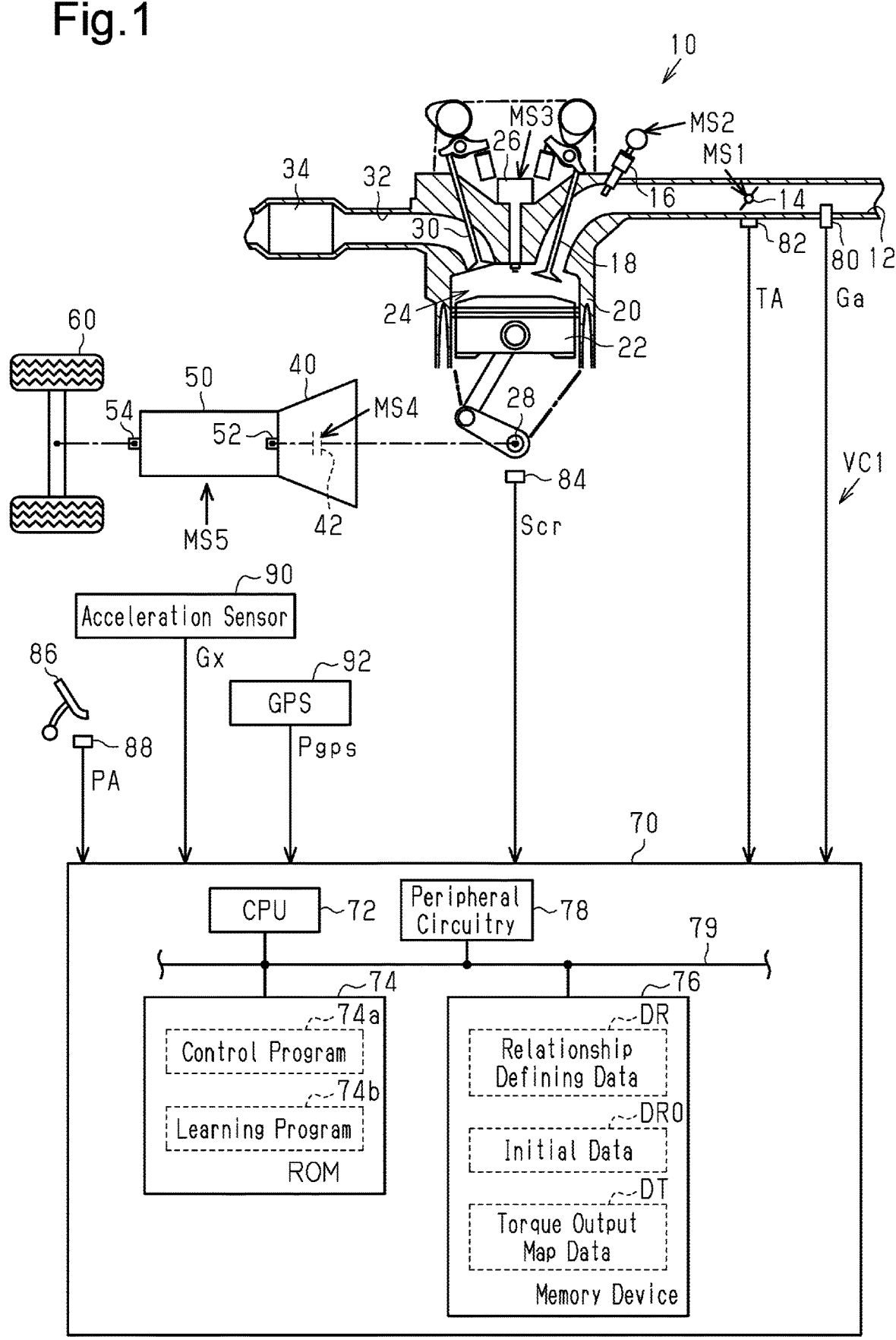
FIG. 1 is a diagram showing a controller according to a first embodiment and a drive system.

FIG. 1 shows the configuration of a drive system of a vehicle VC1 and the controller according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. The air-fuel mixture is burned by spark discharge of an ignition device 26 in the combustion chamber 24, and the energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 variably sets the gear ratio, which is the ratio of the rotation speed of the input shaft 52 and the rotation speed of an output shaft 54. The output shaft 54 is mechanically coupled to driven wheels 60.

A controller 70 controls the internal combustion engine 10 and operates operated units of the engine 10 such as the throttle valve 14, the fuel injection valve 16, and the ignition device 26, thereby controlling the torque and the ratios of exhaust components, which are controlled variables of the internal combustion engine 10. The controller 70 also controls the torque converter 40 and operates the lockup clutch 42 to control the engagement state of the lockup clutch 42. Further, the controller 70 controls and operates the transmission 50, thereby controlling the gear ratio, which is the controlled variable of the transmission 50. FIG. 1 shows operation signals MS1 to MS5 respectively corresponding to the throttle valve 14, the fuel injection valve 16, the ignition device 26, the lockup clutch 42, and the transmission 50.

To control the controlled variables, the controller 70 refers to an intake air amount Ga detected by an air flow meter 80, an opening degree of the throttle valve 14 detected by a throttle sensor 82 (throttle opening degree TA), and an output signal Scr of a crank angle sensor 84. The controller 70 also refers to a depression amount of an accelerator pedal 86 (accelerator operation amount PA) detected by an accelerator sensor 88 and an acceleration Gx in the front-rear direction of the vehicle VC1 detected by an acceleration sensor 90. The controller 70 further refers to positional data Pgps obtained by a global positioning system (GPS 92).

The controller 70 includes a CPU 72, a ROM 74, a nonvolatile memory that can be electrically rewritten (memory device 76), and peripheral circuitry 78, which can communicate with one another through a local network 79. The peripheral circuitry 78 includes a circuit that generates a clock signal regulating internal operations, a power supply circuit, and a reset circuit.

The ROM 74 stores a control program 74a and a learning program 74b. The memory device 76 stores relationship defining data DR, which defines the relationship of the accelerator operation amount PA with a command value of the throttle opening degree TA (throttle command value TA*) and a retardation amount aop of the ignition device 26. The memory device 76 also stores initial data DR0 of the relationship defining data DR. The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. The memory device 76 also stores torque output map data DT. The torque output map data DT defines a torque output map. A rotation speed NE of the crankshaft 28, a charging efficiency η, and the ignition timing are input to the torque output map, which in turn outputs a torque Trq.

Figure 2:
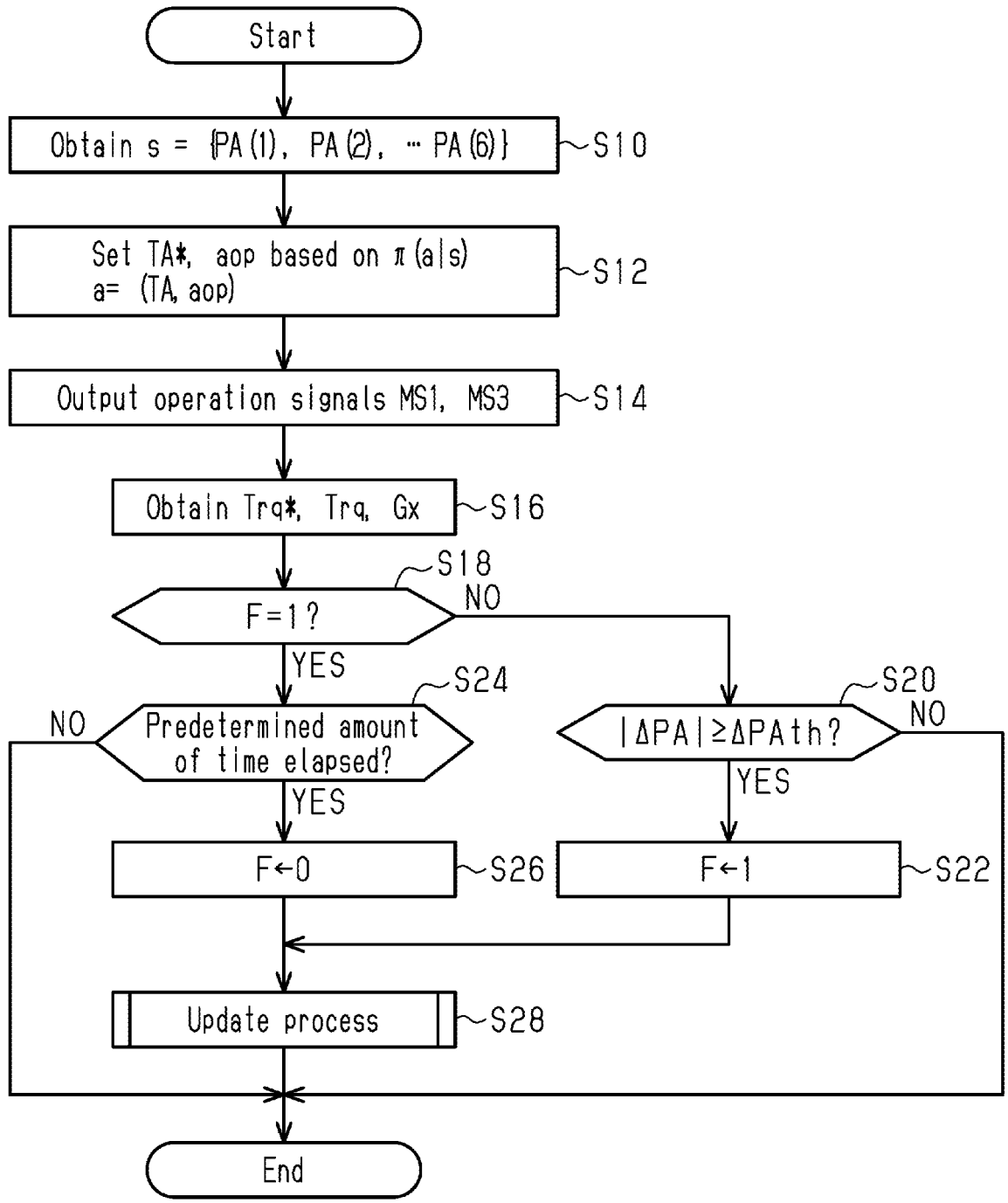
FIG. 2 is a flowchart showing a procedure of processes executed by the controller according to the first embodiment.

FIG. 2 shows a procedure of processes executed by the controller 70 of the present embodiment. The processes shown in FIG. 2 are implemented by the CPU 72 repeatedly executing the control program 74a and the learning program 74b stored in the ROM 74, for example, at predetermined intervals. In the following description, the number of each step is represented by the letter S followed by a numeral.

In the series of processes shown in FIG. 2, the CPU 72 first acquires, as a state s, time-series data including six sampled values PA(1), PA(2), ... PA(6) (S10). The sampled values included in the time-series data have been sampled at different points in time. In the present embodiment, the time-series data includes six sampled values that are consecutive in time in a case in which the values are sampled at a constant sample period.

Next, in accordance with a policy π defined by the relationship defining data DR, the CPU 72 sets an action a, which includes the throttle command value TA* and the retardation amount aop corresponding to the state s obtained through the process of S10 (S12).

In the present embodiment, the relationship defining data DR is used to define an action value function Q and the policy π. In the present embodiment, the action value function Q is a table-type function representing values of expected return in accordance with eight-dimensional independent variables of the state s and the action a. When a state s is provided, the action value function Q includes values of the action a at which the independent variable is the provided state s. Among these values, the one at which the expected return is maximized is referred to as a greedy action. The policy π defines rules with which the greedy action is preferentially selected, and an action a different from the greedy action is selected with a predetermined probability.

Specifically, the number of the values of the independent variable of the action value function Q according to the present embodiment is obtained by deleting a certain amount from all the possible combinations of the state s and the action a, referring to human knowledge and the like. For example, in time-series data of the accelerator operation amount PA, human operation of the accelerator pedal 86 would never create a situation in which one of two consecutive values is the minimum value of the accelerator operation amount PA and the other is the maximum value. Accordingly, the action value function Q is not defined. In the present embodiment, reduction of the dimensions based on human knowledge limits the number of the possible values of the state s defined by the action value function Q to a number less than or equal to 10 to the fourth power, and preferably, to a number less than or equal to 10 to the third power.

Next, the CPU 72 outputs the operation signal MS1 to the throttle valve 14 based on the set throttle command value TA* and retardation amount aop, thereby controlling the throttle opening degree TA, and outputs the operation signal MS3 to the ignition device 26, thereby controlling the ignition timing (S14). The present embodiment illustrates an example in which the throttle opening degree TA is feedback-controlled to the throttle command value TA*. Thus, even if the throttle command value TA* remains the same value, the operation signal MS1 may have different values. For example, when a known knock control system (KCS) is operating, the value obtained by retarding the reference ignition timing by the retardation amount aop is used as the value of the ignition timing corrected through feedback correction in the KCS. The reference ignition timing is varied by the CPU 72 in correspondence with the rotation speed NE of the crankshaft 28 and the charging efficiency η. The rotation speed NE is calculated by the CPU 72 based on the output signal Scr of the crank angle sensor 84. The charging efficiency is calculated by the CPU 72 based on the rotation speed NE and the intake air amount Ga.

The CPU 72 obtains the torque Trq of the internal combustion engine 10, a torque command value Trq* for the internal combustion engine 10, and the acceleration Gx (S16). The CPU 72 calculates the torque Trq by inputting the rotation speed NE and the charging efficiency η to the torque output map. The CPU 72 sets the torque command value Trq* in accordance with the accelerator operation amount PA.

Next, the CPU 72 determines whether a transient flag F is (S18). The value 1 of the transient flag F indicates that a transient operation is being performed, and the value 0 of the transient flag F indicates that the transient operation is not being performed. When determining that the transient flag F is 0 (S18: NO), the CPU 72 determines whether the absolute value of a change amount per unit time $\Delta PA$ of the accelerator operation amount PA is greater than or equal to a predetermined amount $\Delta PAth$ (S20). The change amount $\Delta PA$ simply needs to be the difference between the latest accelerator operation amount PA at the point in time of the execution of S20 and the accelerator operation amount PA of the point in time that precedes the execution of S20 by a certain amount of time.

When determining that the absolute value of the change amount $\Delta PA$ is greater than or equal to the predetermined amount $\Delta PAth$ (S20: YES), the CPU 72 assigns 1 to the transient flag F (S22).

In contrast, when determining that the transient flag F is 1 (S18: YES), the CPU 72 determines whether a predetermined amount of time has elapsed from the point in time of execution of the process of S22 (S24). The predetermined amount of time is an amount of time during which the absolute value of the change amount per unit time $\Delta PA$ of the accelerator operation amount PA remains less than or equal to a specified amount that is less than the predetermined amount $\Delta PAth$. When determining that the predetermined amount of time has elapsed (S24: YES), the CPU 72 assigns 0 to the transient flag F (S26).

When completing the process of S22 or S26, the CPU 72 assumes that one episode has ended and updates the action value function Q through reinforcement learning (S28).

Figure 3:
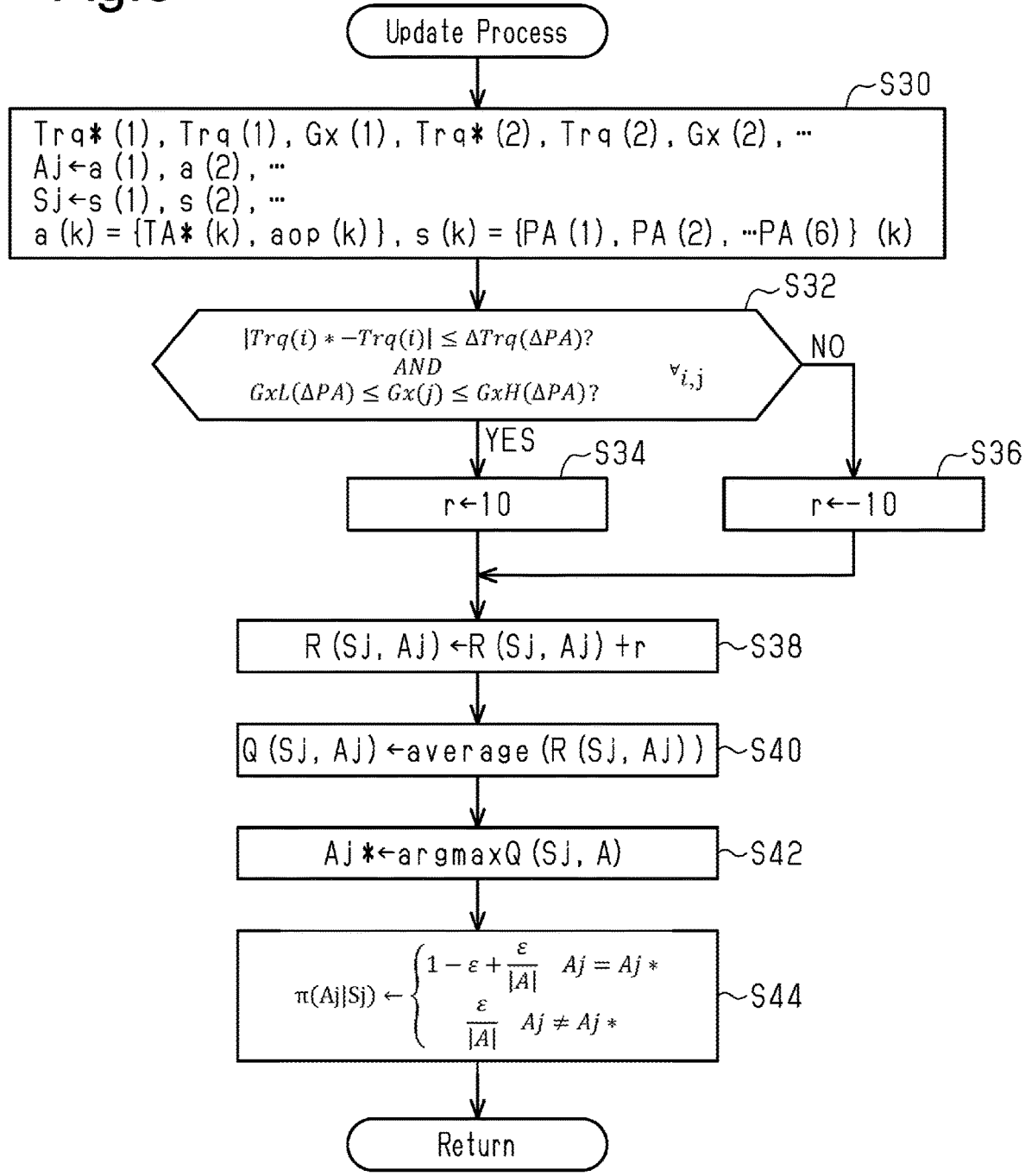
FIG. 3 is a flowchart showing a detailed procedure of some of the processes executed by the controller according to the first embodiment.

FIG. 3 illustrates the details of the process of S28.

In the series of processes shown in FIG. 3, the CPU 72 acquires time-series data including groups of sampled values of the torque command value Trq*, the torque Trq, and the acceleration Gx in the episode that has been ended most recently, and time-series data of the state s and the action a (S30). The most recent episode is a time period during which the transient flag F was continuously 0 if the process of S30 is executed after the process of S22. The most recent episode is a time period during which the transient flag F was continuously 1 if the process of S30 is executed after the process of S26.

In FIG. 3, variables of which the numbers in parentheses are different are variables at different sampling points in time. For example, a torque command value Trq*(1) and a torque command value Trq*(2) have been obtained at different sampling points in time. The time-series data of the action a belonging to the most recent episode is defined as an action set Aj, and the time-series data of the state s belonging to the same episode is defined as a state set Sj.

Next, the CPU 72 determines whether the logical conjunction of the following conditions (A) and (B) is true: the condition (A) is that the absolute value of the difference between an arbitrary torque Trq belonging to the most recent episode and the torque command value Trq* is less than or equal to a specified amount $\Delta Trq$; and the condition (B) is that the acceleration Gx is greater than or equal to a lower limit GxL and less than or equal to an upper limit GxH (S32).

The CPU 72 varies the specified amount $\Delta Trq$ depending on the change amount per unit time $\Delta PA$ of the accelerator operation amount PA at the start of the episode. That is, the CPU 72 determines that the episode is related to transient time if the absolute value of the change amount $\Delta PA$ is great and sets the specified amount $\Delta Trq$ to a greater value than in a case in which the episode related to steady time.

The CPU 72 varies the lower limit GxL depending on the change amount $\Delta PA$ of the accelerator operation amount PA at the start of the episode. That is, when the episode is related to transient time and the change amount $\Delta PA$ has a positive value, the CPU 72 sets the lower limit GxL to a greater value than in a case in which the episode is related to steady time. When the episode is related to transient time and the change amount $\Delta PA$ has a negative value, the CPU 72 sets the lower limit GxL to a smaller value than in a case in which the episode is related to steady time.

Also, the CPU 72 varies the upper limit GxH depending on the change amount per unit time $\Delta PA$ of the accelerator operation amount PA at the start of the episode. That is, when the episode is related to transient time and the change amount $\Delta PA$ has a positive value, the CPU 72 sets the lower upper limit GxH to a greater value than in a case in which the episode is related to steady time. When the episode is related to transient time and the change amount $\Delta PA$ has a negative value, the CPU 72 sets the lower upper limit GxH to a smaller value than in a case in which the episode is related to steady time.

When determining that the logical disjunction is true (S32: YES), the CPU 72 assigns 10 to the reward r (S34). When determining that the logical conjunction is false (S32: NO), the CPU 72 assigns −10 to the reward r (S36). When completing the process of S34 or S36, the CPU 72 updates the relationship defining data DR stored in the memory device 76 shown in FIG. 1. In the present embodiment, the relationship defining data DR is updated by the e-soft on-policy Monte Carlo method.

That is, the CPU 72 adds the reward r to respective returns R(Sj, Aj), which are determined by pairs of the states obtained through the process of S30 and actions corresponding to the respective states (S38). R(Sj, Aj) collectively represents the returns R each having one of the elements of the state set Sj as the state and one of the elements of the action set Aj as the action. Next, the CPU 72 averages each of the returns R(Sj, Aj), which are determined by pairs of the states and the corresponding actions obtained through the process of S30, and assigns the averaged returns R(Sj, Aj) to the corresponding action value functions Q(Sj, Aj) (S40). The averaging process for the return R simply needs to be a process of dividing the return R, which is calculated through the process of S38, by a number obtained by adding a predetermined number to the number of times the process S38 has been executed. The initial value of the return R simply needs to be set to the initial value of the corresponding action value function Q.

Next, for each of the states obtained through the process of S30, the CPU 72 assigns, to an action Aj*, an action that is the combination of the throttle command value TA* and the retardation amount aop in the corresponding action value function Q(Sj, A) at the time when the expected return is maximized (S42). The variable A represents an arbitrary action that can be taken. The action Aj* can have different values depending on the type of the state obtained through the process of S30. However, in view of simplification, the action Aj* has the same symbol regardless of the type of the state in the present description.

Next, the CPU 72 updates the policy π(Aj Sj) corresponding to each of the states obtained through the process of S30 (S44). That is, the CPU 72 sets the selection probability of the action Aj* selected through S42 to $1-\varepsilon+\varepsilon/|A|$, where |A| represents the total number of actions. The number of the actions other than the action Aj* is represented by |A|−1. The CPU 72 sets the selection probability of each of the actions other than the action Aj* to ε/|A|. The process of S44 is based on the action value function Q, which has been updated through the process of S40. Accordingly, the relationship defining data DR, which defines the relationship between the state s and the action a, is updated to increase the return R.

When completing the process of step S44, the CPU 72 temporarily suspends the series of processes shown in FIG. 3.

Figure 4:
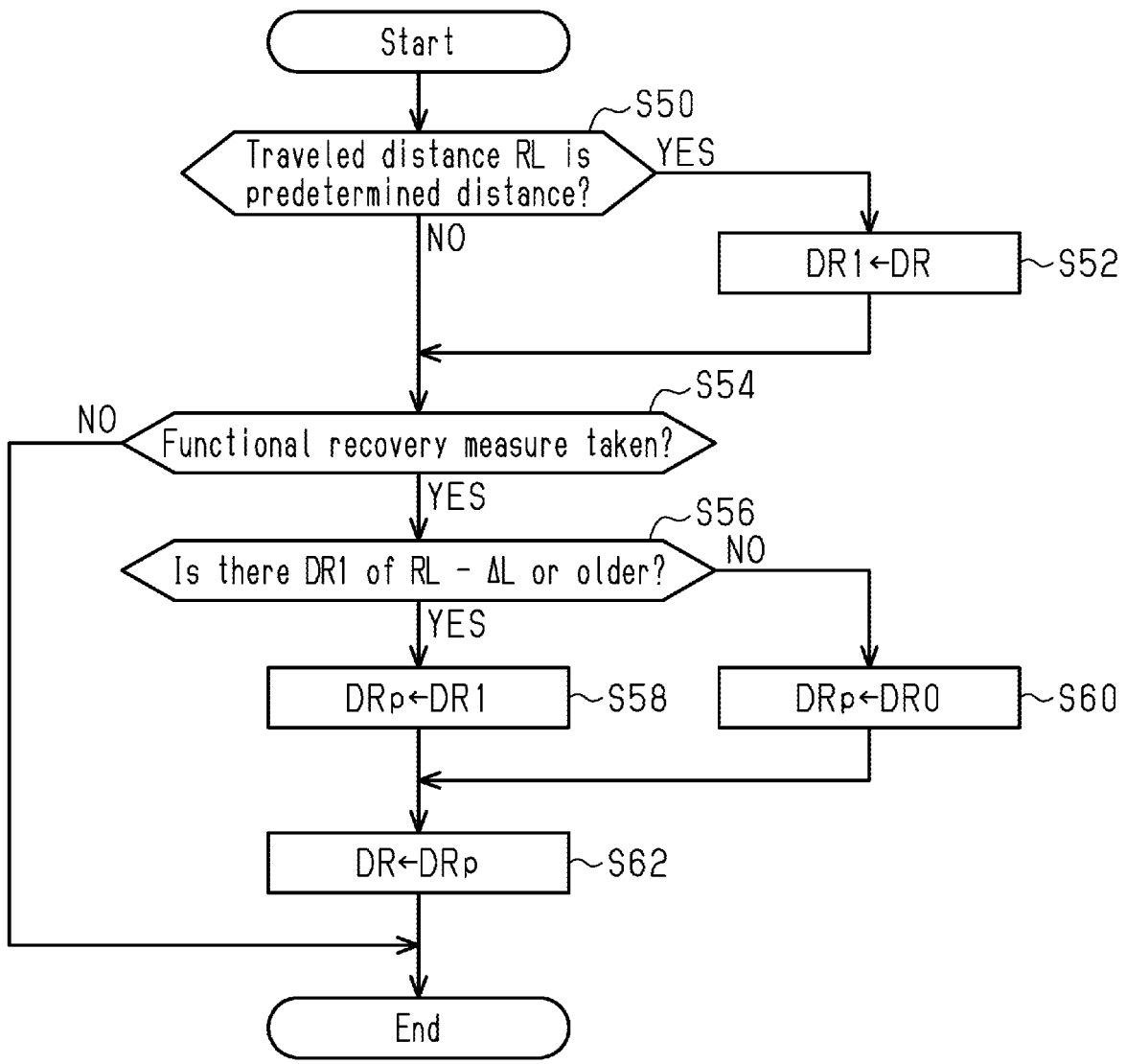
FIG. 4 is a flowchart showing a procedure of processes executed by the controller according to the first embodiment.

Referring back to FIG. 2, the CPU 72 temporarily suspends the series of processes shown in FIG. 2 when the process of S28 is completed or when a negative determination is made in the process of S20 or S24. The processes of S10 to S26 are implemented by the CPU 72 executing the control program 74a, and the process of S28 is implemented by the CPU 72 executing the learning program 74b. The relationship defining data DR at the time of shipment of the vehicle VC1 is the same as the initial data DR0. The initial data DR0 is learned in advance through the process similar to the process shown in FIG. 2, for example, by simulating traveling of a vehicle on a test bench, FIG. 4 shows a procedure of processes executed by the controller 70 of the present embodiment. The processes shown in FIG. 4 are implemented by the CPU 72 repeatedly executing the learning program 74b stored in the ROM 74, for example, at predetermined intervals.

In the series of processes shown in FIG. 4, the CPU 72 first determines whether the traveled distance RL of the vehicle VC1 has become one of predetermined distances (S50). The predetermined distances are multiples of a predetermined amount. The distances are, for example, 10 thousand kilometers, 20 thousand kilometers, 30 thousand kilometers, . . . . . When determining that the traveled distance RL of the vehicle VC1 is one of the predetermined distances (S50: YES), the CPU 72 stores the relationship defining data DR at that time in the memory device 76 as updated data DR1 (S52). In a case in which the predetermined amount is 10 thousand kilometers, when the traveled distance RL is 20 thousand kilometers, two different sets of data are stored in the memory device 76 as the updated data DR1. That is, each time the traveled distance RL is determined to be one of the predetermined distances, the relationship defining data DR at that time is stored in the memory device 76 as a new set of the updated data DR1. Accordingly, the number of sets of the updated data DR1 increases.

The CPU 72 determines whether a functional recovery measure has been taken when the process of S52 is completed or when a negative determination is made in the process of S50 (S54). The present embodiment assumes that, when a functional recovery measure is taken for a component mounted on the vehicle VC1 during the maintenance of the vehicle VC1, the controller 70 receives a signal indicating that the functional recovery measure has been taken from the scan tool. Thus, the CPU 72 determines that a functional recovery measure has been taken when receiving a signal indicating that a functional recovery measure has been taken.

When determining that a functional recovery measure has been taken (S54: YES), the CPU 72 determines whether there is updated data DR1 that corresponds to a point in time when the traveled distance RL was shorter than the current value by a predetermined amount ΔL (S56). When determining that there is updated data DR1 corresponding to that point in time (S56: YES), the CPU 72 assigns the updated data DR corresponding to that point in time to post-measure data DRp (S58). If the memory device 76 stores, as the updated data DR1, two or more sets of data with which an affirmative determination is made in the process of S56, the CPU 72 assigns, to the post-measure data DRp, the set of data corresponding to the longest traveled distance RL When determining that there is no updated data DR1 corresponding to that point in time (S56: NO), the CPU 72 assigns the initial data DR0 to the post-measure data DRp (S60).

When completing the process of S58 or S60, the CPU 72 rewrites the relationship defining data DR used in the process of S12 to the post-measure data DRp (S62).

When completing the process of S62 or when making a negative determination in the process of S54, the CPU 72 temporarily suspends the series of processes shown in FIG. 4.

The operation and advantages of the present embodiment will now be described.

The CPU 72 obtains time-series data of the accelerator operation amount PA as the user operates the accelerator pedal 86, and sets the action a, which includes the throttle command value TA* and the retardation amount aop, according to the policy π. Basically, the CPU 72 selects the action a that maximizes the expected return, based on the action value function Q defined by the relationship defining data DR. However, the CPU 72 searches for the action a that maximizes the expected return by selecting, with the predetermined probability a, actions other than the action a that maximizes the expected return. This allows the relationship defining data DR to be updated through reinforcement learning as the user drives the vehicle VC1. Thus, the throttle command value TA* corresponding to the accelerator operation amount PA and the retardation amount aop can be set to appropriate values for driving of the vehicle VC1 without excessively increasing the man-hours by skilled workers.

In this manner, the relationship defining data DR, which is the initial data DR0 at the shipment of the vehicle VC1, keeps being updated as the vehicle VC1 travels. Even for the same throttle opening degree TA, if deposit accumulates on the throttle valve 14 and the intake passage 12, the cross-sectional flow area of the intake passage 12 is reduced. This reduces the intake air amount Ga. Thus, the throttle command value TA*, which is defined by the relationship defining data DR and maximizes the expected return in accordance with time-series data of the accelerator operation amount PA, may be updated to compensate for changes in the cross-sectional flow area of the intake passage 12 due to accumulation of deposit on the throttle valve 14. That is, the relationship defining data DR is learned such that aging deterioration of components of the vehicle VC1 is compensated. After such learning is performed, if a functional recovery measure is taken by replacing the component or cleaning the component during maintenance, the relationship defining data DR may no longer be appropriate for determining an action that increases the expected return.

Accordingly, when determining that a functional recovery measure has been taken, the CPU 72 assigns the initial data DR0 to the post-measure data DRp and rewrites the relationship defining data DR to the post-measure data DRp. The initial data DR0 is data that has not been updated to compensate for deterioration of components. Thus, since the relationship defining data DR is rewritten to the initial data DR0, the throttle valve 14 and the ignition device 26 are operated using appropriate data after a functional recovery measure is taken, as compared to a case in which the relationship defining data DR before a functional recovery measure keeps being used after the functional recovery measure is taken.

The present embodiment described above further has the following operational advantages.

(1) Each time the traveled distance RL increases by a predetermined amount (S50: YES), the CPU 72 stores the relationship defining data DR at that time as the updated data DR1 (S52). When determining that a functional recovery measure has been taken (S54: YES), the CPU 72 proceeds to S56. Then, the CPU 72 determines whether there is updated data DR1 that corresponds to the time when the traveled distance RL was shorter than the current value by the predetermined amount ΔL. If the determination is affirmative in S56 (S56: YES), the CPU 72 sets the post-measure data DRp to the updated data DR1 (S58). In this manner, the CPU 72 rewrites the relationship defining data DR, which is used to set the throttle command value TA* and the retardation amount aop (S62). The updated data DR is obtained by updating the initial data DR0, which is the relationship defining data DR at the time of shipment of the vehicle VC1, as the vehicle VC actually travels. Since the updated data DR1 is the relationship defining data DR at the traveled distance RL that is shorter than the traveled distance at the time when the functional recovery measure is taken by the predetermined amount ΔL, the updated data DR1 is not significantly affected by deterioration of the component at the point in time when the functional recovery measure is taken. Thus, by being updated to the updated data DR1, the relationship defining data DR becomes appropriate for the vehicle VC1 after the functional recovery measure.

(2) The independent variables of the action value function Q include time-series data of the accelerator operation amount PA. The value of the action a thus can be finely adjusted in response to various changes in the accelerator operation amount PA, as compared to a case in which a single sampled value is used as the independent variable regarding the accelerator operation amount PA.

(3) The independent variables of the action value function Q include the throttle command value TA*. This increases the degree of flexibility of the search performed by reinforcement learning as compared to a case in which a parameter of a model equation that models the behavior of the throttle command value TA* is used as an independent variable related to the throttle opening degree.

Second Embodiment

A second embodiment will now be described with reference to FIGS. 5 and 6. Differences from the first embodiment will mainly be discussed.

Figure 5:
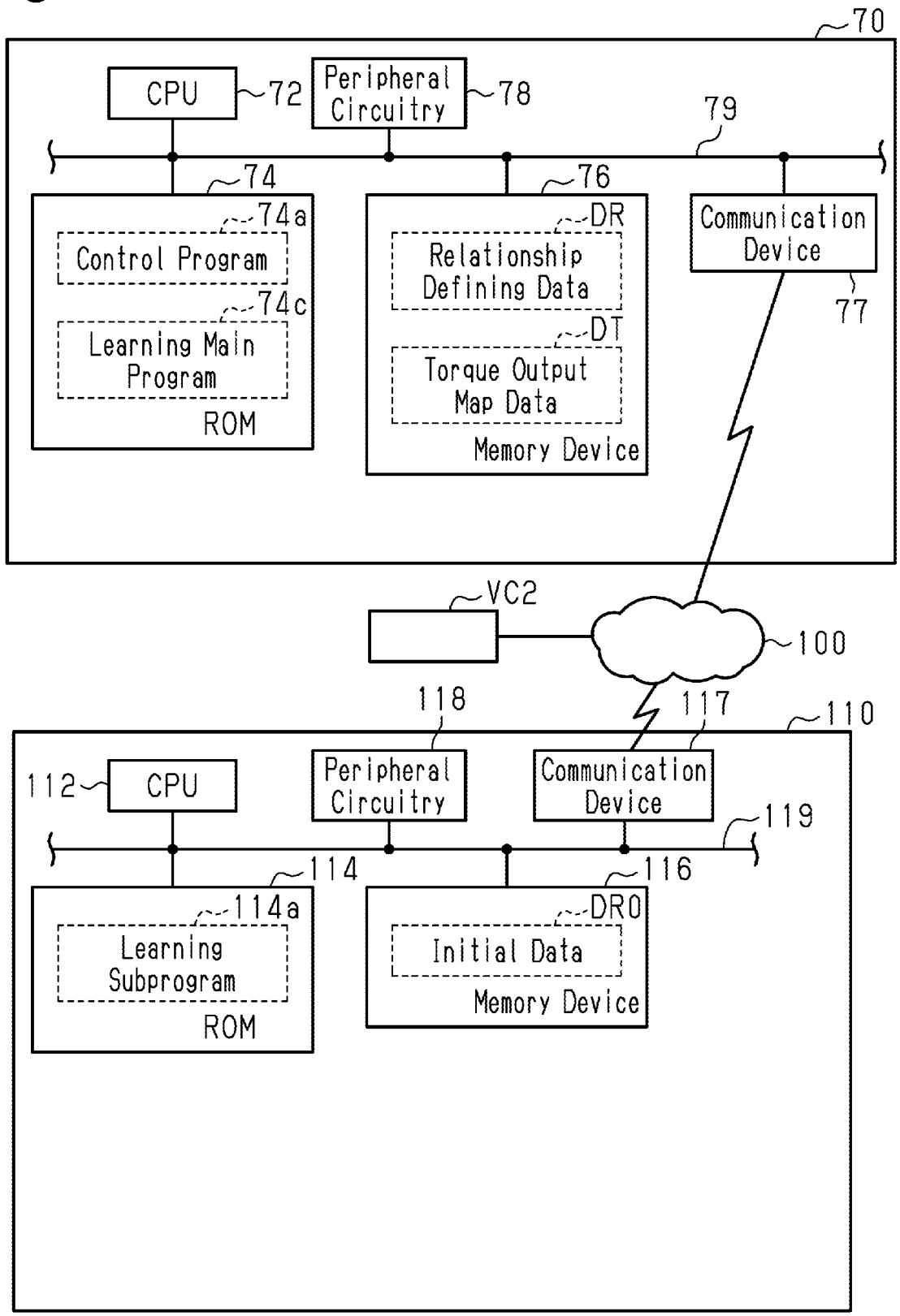
FIG. 5 is a diagram showing the configuration of a vehicle control system according to a second embodiment.

FIG. 5 shows the configuration of a control system that performs reinforcement learning. In FIG. 5, the same reference numerals are given to the components that are the same as those in FIG. 1 for the illustrative purposes.

The ROM 74 in the vehicle VC1 shown in FIG. 5 stores a learning main program 74c in addition to the control program 74a. Although the memory device 76 in the vehicle VC1 stores the torque output map data DT and the relationship defining data DR, the memory device 76 does not store initial data DR0. The controller 70 includes a communication device 77. The communication device 77 communicates with a data analysis center 110 via a network 100 outside the vehicle VC1.

The data analysis center 110 analyzes data transmitted from vehicles VC1, VC2, . . . . The data analysis center 110 includes a CPU 112, a ROM 114, a nonvolatile memory that can be electrically rewritten (memory device 116), peripheral circuitry 118, and a communication device 117, which can communicate with each other through a local network 119. The ROM 114 stores a learning subprogram 114a. The memory device 116 also stores initial data DR0.

Figure 6:
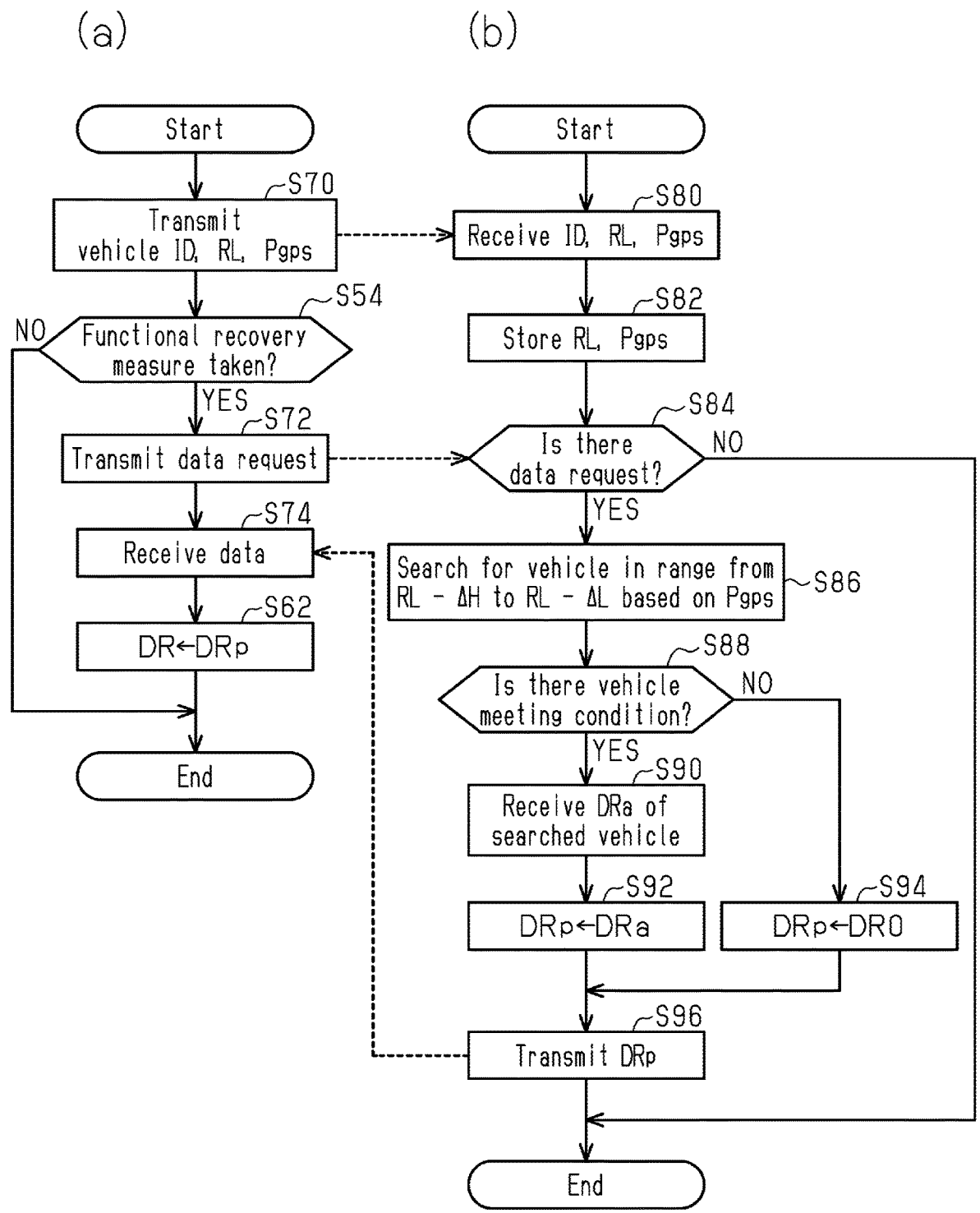
FIG. 6 includes sections (a) and (b), which show a procedure of processes executed by the vehicle control system of FIG. 5.

FIG. 6 shows a procedure of processes dealing with a functional recovery measure according to the present embodiment. The processes shown in a section (a) of FIG. 6 are implemented by the CPU 72 executing the learning main program 74c stored in the ROM 74 shown in FIG. 5. The processes shown in a section (b) of FIG. 6 are implemented by the CPU 112 executing the learning subprogram 114a stored in the ROM 114. In FIG. 6, the same step numbers are given to the processes that correspond to those in FIG. 4. The processes shown in FIG. 6 will now be described according to the temporal sequence.

In the series of processes shown in the section (a) of FIG. 6, the CPU 72 first operates the communication device 77 to transmit identification information ID of the vehicle VC1, the traveled distance RL, and the positional data Pgps (S70).

As shown in the section (b) of FIG. 6, the CPU 112 receives the identification information ID, the traveled distance RL, and the positional data Pgps (S80). The CPU 112 then updates the traveled distance RL and the positional data Pgps, which are stored in the memory device 116 and associated with the identification information ID, to the values received through the process of S80 (S82).

On the other hand, in the series of processes shown in the section (a) of FIG. 6, the CPU 72 executes the process of S54. When making an affirmative determination in the process of S54, the CPU 72 operates the communication device 77 to transmit a signal requesting post-measure data DRp that is suitable as the relationship defining data DR used in the process of S12 (S72).

As shown in the section (b) of FIG. 6, the CPU 112 determines whether there is post-measure data DRp (S84). When determining that there is post-measure data DRp (S84: YES), the CPU 112 searches for a vehicle of which the traveled distance is short and that is close to the vehicle VC1, which has transmitted the request signal (S86). The condition that must be met by a vehicle to be "close to the vehicle VC" is that the distance from the vehicle VC1, which has transmitted the request signal, is less than or equal to a predetermined distance on the basis of the positional data Pgps of the respective vehicles that has been stored through the process of S82. A vehicle of which the traveled distance is shorter than that of the vehicle VC1, which has transmitted the request signal, refers to a vehicle of which the traveled distance is shorter than the traveled distance RL of the vehicle VC1 by an amount greater than or equal to the predetermined amount ΔL and less than or equal to a specified amount ΔH.

The reason for searching for a vehicle of which the distance from the vehicle VC1 is less than or equal to a predetermined distance is because the relationship defining data DR of a vehicle of which the distance from the vehicle VC1 is excessive may be inappropriate for increasing the expected return of the vehicle VC1 due to differences in the environment from the vehicle VC1. Also, the reason for selecting a vehicle of which the traveled distance is shorter than that of the vehicle VC1 by an amount greater than or equal to the predetermined amount ΔL and less than or equal to the specified amount ΔH is to identify a vehicle of which the state is similar to the state of the vehicle VC1 before deterioration of components.

When determining that there is a vehicle meeting the condition (S88: YES), the CPU 112 operates the communication device 117 to prompt that vehicle to transmit the relationship defining data DR and receives the relationship defining data DR of that vehicle as different vehicle defining data DRa (S90). Next, the CPU 112 assigns the different vehicle defining data DRa to the post-measure data DRp (S92). When determining that there is no vehicle meeting the condition (S88: NO), the CPU 112 assigns the initial data DR0 to the post-measure data DRp (S94). When completing the process of S92 or S94, the CPU 112 operates the communication device 117 to transmit the post-measure data DRp to the vehicle VC1, which has requested the post-measure data DRp (S96). When completing the process of S96 or when making a negative determination in the process of S84, the CPU 112 temporarily suspends the series of processes shown in the section (b) of FIG. 6.

On the other hand, as shown in the section (a) of FIG. 6, the CPU 72 receives the transmitted post-measure data DRp (S74) and executes the process of S62.

When completing the process of S62 or when making a negative determination in the process of S54, the CPU 72 temporarily suspends the series of processes shown in the section (a) of FIG. 6.

<Correspondence>

The correspondence between the items in the above embodiments and the items described in the above SUMMARY is as follows. Below, the correspondence is shown for each of the numbers in the examples described in the above SUMMARY Regarding Aspect 1, the execution device corresponds to the CPU 72 and the ROM 74, and the memory device corresponds to the memory device 76. The obtaining process corresponds to the processes of S10, S16, and the operation process corresponds to the process of S14. The reward calculating process corresponds to the processes of S32 to S36, and the update process corresponds to the processes of S38 to S44. The detection process corresponds to the process of S54, and the switching process corresponds to the process of S62. The update map corresponds to the map defined by the command that executes the processes of S38 to S44 in the learning program 74b.

Regarding Aspect 2, the past data maintaining process corresponds to the process of S52.

Regarding Aspects 3 and 5, the post-measure data requesting process corresponds to the process of S72, and the post-measure data receiving process corresponds to the process of S74.

Regarding Aspects 4 and 6 to 8, the first execution device corresponds to the CPU 72 and the ROM 74, and the second execution device corresponds to the CPU 112 and the ROM 114. The post-measure data transmitting process corresponds to the process of S96, and the post-measure data receiving process corresponds to the process of S74.

Other Embodiments

The present embodiment may be modified as follows. The above-described embodiment and the following modifications can be combined as long as the combined modifications remain technically consistent with each other.

Regarding Detection Process

In the above-described embodiment, a signal indicating that a functional recovery measure has been taken is delivered to the controller 70 from a scan tool connected to the controller 70, so that the controller 70 detects the functional recovery measure. However, the detection process is not limited to this. For example, when a functional recovery measure is taken, for example, at a repair shop, that fact may be reported to the data analysis center 110 through the network 100. In this case also, the post-measure data DRp can be transmitted to the controller 70 by executing processes similar to the processes of S80, S82, S86 to S96 of the section (b) of FIG. 6 at the data analysis center 110.

The detection process is not limited to the ones executed by the controller 70 or at the data analysis center 110. For example, when the vehicle control system includes a portable terminal as described in the Regarding Vehicle Control System section below, the portable terminal may execute the detection process. When the vehicle control system includes the controller 70, a portable terminal, and the data analysis center 110, the portable terminal simply needs to transmit a signal requesting the post-measure data DRp to the data analysis center 110 after executing the detection process.

The detection process is not limited to a process in which a signal, for example, from a repair shop is directly detected. For example, in a case in which a signal indicating that a functional recovery measure has been taken may be transmitted to a portable terminal, which in turn transmits the signal to the controller 70, the process of the controller 70 receiving the signal from the portable terminal may be regarded as the detection process.

Regarding Past Data Maintaining Process

In the above-described embodiment, each time the traveled distance RL increases by a predetermined distance, the relationship defining data DR at that time is stored as the updated data DR1. However, the present disclosure is not limited to this. For example, the updated data DR1 may be defined in the following manner. The throttle opening degree TA in the fully opened state is defined as 100%. The average of the intake air amount Ga corresponding to each percent is calculated. The calculated average is used to quantify the accumulated amount of deposit around the throttle valve 14. When the average changes by a specified value, the relationship defining data DR at that time is used as the updated data DR1. The specified value is set to an upper limit of the range in which the influence on the intake air amount Ga can be ignored.

Regarding Post-Measure Data Transmitting Process

The data required by the controller 70 when executing the switching process is not limited to the post-measure data DRp. For example, in a case in which a signal indicating that a functional recovery measure has been taken is transmitted to the data analysis center 110 from a repair shop through the network 100 as described in the Regarding Detection Process section above, data indicating that transmission and the post-measure data DRp may be transmitted to the controller 70 from the data analysis center 110.

The processes of S86 to S92 may be omitted, and the post-measure data DRp, which is transmitted to the controller 70 from the data analysis center 110, may always be used as the initial data DR0.

Alternatively, the processes similar to the process of S28 in FIG. 2 and the processes of S50, S52, S56 to S62 in FIG. 4 may be executed by the data analysis center 110, and the post-measure data DRp, which is generated through the process of S62, may be transmitted to the controller 70.

Regarding Initial Data

The initial data DR0 does not necessarily need to be data for which reinforcement learning was performed on a test bench. For example, the initial data DR0 may be data for which reinforcement learning was performed when a test-drive vehicle, which is different from the vehicle to be shipped, traveled. Also, the initial data DR0 is not limited to data generated through reinforcement learning, but may be data generated based on the control logic in a vehicle that has already been adapted by a known method. In this case also, by updating the relationship defining data DR by reinforcement learning after the shipment of the vehicle, data that increases the expected return as compared to the initial data DR0 can be generated without increasing the man-hours by skilled workers.

Regarding Action Variable

In the above-described embodiments, the throttle command value TA* is used as an example of the variable related to the opening degree of a throttle valve, which is an action variable. However, the present disclosure is not limited to this. For example, the responsiveness of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

In the above-described embodiments, the retardation amount aop is used as the variable related to the ignition timing, which is an action variable. However, the present disclosure is not limited to this. For example, the ignition timing, which is corrected by a KCS, may be used as the variable related to the ignition timing.

In the above-described embodiments, the variable related to the opening degree of the throttle valve and the variable related to the ignition timing are used as examples of action variables. However, the present disclosure is not limited to this. For example, the variable related to the opening degree of the throttle valve and the variable related to the ignition timing may be replaced by the fuel injection amount. With regard to these three variables, only the variable related to the opening degree of the throttle valve or the fuel injection amount may be used as the action variable. Alternatively, only the variable related to the ignition timing and the fuel injection amount may be used as the action variables. Only one of the three variables may be used as the action variable.

As described in the Regarding Internal Combustion Engine section below, in the case of a compression ignition internal combustion engine, a variable related to an injection amount simply needs to be used in place of the variable related to the opening degree of the throttle valve, and a variable related to the injection timing may be used in place of the variable related to the ignition timing. In addition to the variable related to the injection timing, it is preferable to use a variable related to the number of times of injection within a single combustion cycle and a variable related to the time interval between the ending point in time of one fuel injection and the starting point in time of the subsequent fuel injection for a single cylinder within a single combustion cycle.

For example, in a case in which the transmission 50 is a multi-speed transmission, the action variable may be the value of the current supplied to the solenoid valve that adjusts the engagement of the clutch using hydraulic pressure.

For example, as described the Regarding Vehicle section below, when a hybrid vehicle, an electric vehicle, or a fuel cell vehicle is used as the vehicle, the action variable may be the torque or the output of the rotating electric machine. Further, when the present disclosure is employed in a vehicle equipped with an air conditioner that includes a compressor, and the compressor is driven by the rotational force of the engine crankshaft, the action variable may include the load torque of the compressor. When the present disclosure is employed in a vehicle equipped with a motor-driven air conditioner, the action variables may include the power consumption of the air conditioner.

Regarding State

In the above-described embodiments, the time-series data of the accelerator operation amount PA includes six values that are sampled at equal intervals. However, the present disclosure is not limited to this. The time-series data of the accelerator operation amount PA may be any data that includes two or more values sampled at different sampling points in time. It is preferable to use data that includes three or more sampled values or data of which the sampling interval is constant.

The state variable related to the accelerator operation amount is not limited to the time-series data of the accelerator operation amount PA. For example, as described in the Regarding Action Variable section above, the amount of change per unit time of the accelerator operation amount PA may be used.

For example, when the current value of the solenoid valve is used as the action variable as described in the Regarding Action Variable section above, the state simply needs to include the rotation speed of the input shaft 52 of the transmission, the rotation speed of the output shaft 54, and the hydraulic pressure regulated by the solenoid valve. Also, when the torque or the output of the rotating electric machine is used as the action variable as described in the Regarding Action Variable section above, the state simply needs to include the state of charge and the temperature of the battery. Further, when the action includes the load torque of the compressor or the power consumption of the air conditioner, the state simply needs to include the temperature in the passenger compartment.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

Regarding Relationship Defining Data

In the above-described embodiments, the action value function Q is a table-type function. However, the present disclosure is not limited to this. For example, a function approximator may be used.

For example, instead of using the action value function Q, the policy a may be expressed by a function approximator that uses the state s and the action a as independent variables and uses the probability that the action a will be taken as a dependent variable. In this case, parameters defining the function approximator may be updated in accordance with the reward r.

Regarding Operation Process

For example, when using a function approximator as the action value function Q as described in the Regarding Relationship Defining Data section above, all the groups of discrete values related to actions that are independent variables of the table-type function of the above-described embodiments simply need to be input to the action value function Q together with the state s, so as to select the action a that maximizes the action value function Q.

For example, when the policy π is a function approximator that uses the state s and the action a as independent variables, and uses the probability that the action a will be taken as a dependent variable as in the Regarding Relationship Defining Data section above, the action a simply needs to be selected based on the probability indicated by the policy n.

Regarding Update Map

The F-soft on-policy Monte Carlo method is executed in the process of S38 to S44. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy π is expressed using a function approximator, and the function approximator is directly updated based on the reward r, the update map is preferably constructed using, for example, a policy gradient method.

The present disclosure is not limited to the configuration in which only one of the action value function Q and the policy π is directly updated using the reward r. For example, the action value function Q and the policy 7 may be separately updated as in an actor critic method. Alternatively, in an actor critic method, a value function V may be updated in place of the action value function Q.

The value ε, which defines the policy π, does not necessarily need to be a fixed value, but may be changed in accordance with the progress of learning according to predetermined rules.

Regarding Reward Calculating Process

In the process of S32 of FIG. 3, the reward is provided depending on whether the logical disjunction of the conditions (A) and (B) is true. However, the present disclosure is not limited to this. For example, it is possible to execute a process that provides the reward depending on whether the condition (A) is met and a process that provides the reward depending on whether the condition (B) is met. For example, it is possible to execute only one of a process that provides the reward depending on whether the condition (A) is met and a process that provides the reward depending on whether the condition (B) is met.

For example, instead of providing the same reward without exception when the condition (A) is met, a process may be executed in which a greater reward is provided when the absolute value of the difference between the torque Trq and the torque command value Trq* is small than when the absolute value is great. Also, instead of providing the same reward without exception when the condition (A) is not met, a process may be executed in which a smaller reward is provided when the absolute value of the difference between the torque Trq and the torque command value Trq* is great than when the absolute value is small.

For example, instead of providing the same reward without exception when the condition (B) is met, a process may be executed in which the reward is varied in accordance with the acceleration Gx. Also, instead of providing the same reward without exception when the condition (B) is not met, a process may be executed in which the reward is varied in accordance with the acceleration Gx.

In the above-described embodiment, the reward r is provided depending whether the standard related to drivability is met. The standard related to drivability is not limited to the one described above. For example, the reward r may be provided depending on whether noise or vibration intensity meets a standard. The standard related to drivability may include whether one or more of the following four conditions is met: whether the acceleration meets a standard; whether the following performance of the torque Trq meets a standard; whether the noise meets a standard; and whether the vibration intensity meets a standard.

The reward calculating process is not limited to the process that provides the reward r depending whether the standard related to drivability is met. The reward calculating process may be a process that provides a greater reward, for example, when the fuel consumption rate meets a standard than when the fuel consumption rate does not meet the standard. Further, the reward calculating process may be a process that provides a greater reward, for example, when the exhaust characteristic meets a standard than when the exhaust characteristic does not meet the standard. The reward calculating process may include two or three of the following processes: the process that provides a greater reward when the standard related to drivability is met than when the standard is not met; the process that provides a greater reward when the energy use efficiency meets the standard than when the energy use efficiency does not meet the standard; and the process that provides a greater reward when the exhaust characteristic meets the standard than when the exhaust characteristic does not meet the standard.

For example, when the current value of the solenoid valve of the transmission 50 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the transmission input shaft 52 is less than or equal to an input-side predetermined value than when the absolute value exceeds the input-side predetermined value.

(c) A process that provides a greater reward when the absolute value of the rate of change of the rotation speed of the transmission output shaft 54 is less than or equal to an output-side predetermined value than when the absolute value exceeds the output-side predetermined value.

Also, when the torque or the output of the rotating electric machine is used as the action variable as described in the Regarding Action Variable section above, the reward calculating process may include the following processes: a process that provides a greater reward when the state of charge of the battery is within a predetermined range than when the state of charge is out of the predetermined range; and a process that provides a greater reward when the temperature of the battery is within a predetermined range than when the temperature is out of the predetermined range. Further, when the action variable includes the load torque of the compressor or the power consumption of the air conditioner as described in the Regarding Action Variable section above, the reward calculating process may include the following process: a process that provides a greater reward when the temperature in the passenger compartment is within a predetermined range than when the temperature is out of the predetermined range.

Regarding Vehicle Control System

The vehicle control system does not necessarily include the controller 70 and the data analysis center 110. For example, the vehicle control system may include a portable terminal carried by a user in place of the data analysis center 110, so that the vehicle control system includes the controller 70 and the portable terminal. Also, the vehicle control system may include the controller 70, a portable terminal, and the data analysis center 110.

Regarding Execution Device

The execution device is not limited to the device that includes the CPU 72 (112) and the ROM 74 (114) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Memory Device

In the above-described embodiments, the memory device storing the relationship defining data DR and the memory device (ROM 74) storing the learning program 74b and the control program 74a are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include a port injection valve and a direct injection valve.

The internal combustion engine is not limited to a spark-ignition engine, but may be a compression ignition engine that uses, for example, light oil or the like.

Regarding Vehicle

The vehicle is not limited to a vehicle that includes only an internal combustion engine as a propelling force generator, but may be a hybrid vehicle includes an internal combustion engine and a rotating electric machine. Further, the vehicle may be an electric vehicle or a fuel cell vehicle that includes a rotating electric machine as the propelling force generator, but does not include an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
a memory configured to store relationship defining data that defines a relationship between a state of a vehicle that includes at least one of an internal combustion engine and a rotating electric machine and an action variable related to an operation of an operated unit of the at least one of the internal combustion engine and the rotating electric machine; and
circuitry configured to execute:
an obtaining process that obtains a detection value of a sensor that detects the state of the vehicle,
an operation process that operates the operated unit of the at least one of the internal combustion engine and the rotating electric machine based on a value of the action variable that is determined by the detection value obtained by the obtaining process and the relationship defining data,
a reward calculating process that provides, based on the detection value obtained by the obtaining process, a greater reward when a characteristic of the vehicle meets a standard than when the characteristic of the vehicle does not meet the standard,
an update process that updates the relationship defining data by inputting, to a predetermined update map, the state of the vehicle based on the detection value obtained by the obtaining process, the value of the action variable used to operate the operated unit of the at least one of the internal combustion engine and the rotating electric machine, and the reward corresponding to the operation of the operated unit of the at least one of the internal combustion engine and the rotating electric machine,
a detection process that detects that a functional recovery measure has been taken for a component in the vehicle that affects the state of the vehicle created by the operation process, and
a switching process that switches the relationship defining data used in the operation process to post-measure data, when the detection process detects that the functional recovery measure has been taken,
the update map outputs the updated relationship defining data so as to increase an expected return of the reward of a case in which the operated unit of the at least one of the internal combustion engine and the rotating electric machine is operated in accordance with the relationship defining data, and
the switching process includes a process that uses, as the post-measure data, initial data that is the relationship defining data of a state before the update process is executed as the vehicle travels.

2. The vehicle controller according to claim 1, wherein
the circuitry is configured to execute a past data maintaining process that stores, in the memory, the relationship defining data that is updated by the update process until a predetermined condition is met and avoids update by the update process after the predetermined condition is met, apart from the relationship defining data that is updated by the update process, and
the switching process includes a process that selects, as the post-measure data, the initial data or the relationship defining data that is updated in the past data maintaining process through the update process before the predetermined condition is met.

3. The vehicle controller according to claim 1, wherein
the circuitry is configured to execute, when the detection process detects that the functional recovery measure has been taken:
   a post-measure data requesting process that transmits a signal requesting the post-measure data, and
   a post-measure data receiving process that receives the post-measure data transmitted as a result of the post-measure data requesting process, and
the switching process includes a process that switches the relationship defining data used in the operation process to the received post-measure data.

4. A vehicle control system, comprising
the vehicle controller according to claim 1, wherein
the circuitry includes:
   a first circuitry mounted on the vehicle, and
   a second circuitry that is outside of the vehicle,
the second circuitry is configured to execute at least a post-measure data transmitting process that transmits the post-measure data, when the detection process detects that a functional recovery measure has been taken,
the first circuitry is configured to execute at least the obtaining process, the operation process, and a post-measure data receiving process, and
the post-measure data receiving process receives data transmitted by the post-measure data transmitting process.

5. The vehicle control system according to claim 4, wherein
   the first circuitry is configured to execute the detection process and a post-measure data requesting process, and
   the post-measure data requesting process transmits a signal requesting the post-measure data, when the detection process detects that the functional recovery measure has been taken.

6. The vehicle control system according to claim 4, wherein the update process is executed by the first circuitry.

7. The vehicle control system according to claim 4, comprising:
   a vehicle controller including the first circuitry.

8. The vehicle control system according to claim 4, comprising:
   a vehicle learning device including the second circuitry.

9. A vehicle control method comprising:
using a memory to store relationship defining data that defines a relationship between a state of a vehicle that includes at least one of an internal combustion engine and a rotating electric machine and an action variable related to an operation of an operated unit of the at least one of the internal combustion engine and the rotating electric machine in the vehicle; and
using circuitry to:
   obtain a detection value of a sensor that detects the state of the vehicle,
   operate the operated unit of the at least one of the internal combustion engine and the rotating electric machine based on a value of the action variable that is determined by the obtained detection value and the relationship defining data,
   based on the obtained detection value, provide a greater reward when a characteristic of the vehicle meets a standard than when the characteristic of the vehicle does not meet the standard,
   update the relationship defining data by inputting, to a predetermined update map, the state of the vehicle based on the obtained detection value, a value of the action variable used to operate the operated unit of the at least one of the internal combustion engine and the rotating electric machine, and the reward corresponding to the operation of the operated unit of the at least one of the internal combustion engine and the rotating electric machine,
   detect that a functional recovery measure has been taken for a component in the vehicle that affects the state of the vehicle created by the operated unit of the at least one of the internal combustion engine and the rotating electric machine, and
   switch the relationship defining data used to operate the operated unit of the at least one of the internal combustion engine and the rotating electric machine to post-measure data, when it is detected that the functional recovery measure has been made, wherein
the update map outputs the updated relationship defining data so as to increase an expected return of the reward of a case in which the operated unit of the at least one of the internal combustion engine and the rotating electric machine is operated in accordance with the relationship defining data, and
the switching the relationship defining data includes using, as the post-measure data, initial data that is the relationship defining data of a state before the relationship defining data is updated as the vehicle travels.

10. A non-transitory computer readable medium that stores a program for causing a controller to execute a vehicle control process, the vehicle control process comprising:
   a memory to store relationship defining data that defines a relationship between a state of a vehicle that includes at least one of an internal combustion engine and a rotating electric machine and an action variable related to an operation of an operated unit of the at least one of the internal combustion engine and the rotating electric machine in the vehicle; and
using circuitry to:
   obtain a detection value of a sensor that detects the state of the vehicle,
   operate the operated unit of the at least one of the internal combustion engine and the rotating electric machine based on a value of the action variable that is determined by the obtained detection value and the relationship defining data,
   based on the obtained detection value, provide a greater reward when a characteristic of the vehicle meets a standard than when the characteristic of the vehicle does not meet the standard,
   update the relationship defining data by inputting, to a predetermined update map, the state of the vehicle based on the obtained detection value, a value of the action variable used to operate the operated unit of the at least one of the internal combustion engine and the rotating electric machine, and the reward corresponding to the operation of the operated unit of the at least one of the internal combustion engine and the rotating electric machine,
   detect that a functional recovery measure has been taken for a component in the vehicle that affects the state of the vehicle created by the operated unit of the at least one of the internal combustion engine and the rotating electric machine, and
   switch the relationship defining data used to operate the operated unit of the at least one of the internal combustion engine and the rotating electric machine to post-measure data, when it is detected that the functional recovery measure has been made, wherein
the update map outputs the updated relationship defining data so as to increase an expected return of the reward of a case in which the operated unit of the at least one of the internal combustion engine and the rotating electric machine is operated in accordance with the relationship defining data, and
the switching the relationship defining data includes using, as the post-measure data, initial data that is the relationship defining data of a state before the relationship defining data is updated as the vehicle travels.

\* \* \* \* \*